United States Patent [19]

D'Amelia et al.

[11] 4,452,820

[45] Jun. 5, 1984

[54] GUM BASE AND CHEWING GUM CONTAINING SAME

[75] Inventors: Ronald P. D'Amelia, Hicksville, N.Y.; John J. Stroz, Monroe, Conn.; Rouben Kachikian, Old Tappan, N.J.

[73] Assignee: Nabisco Brands, Inc., Parsippany, N.J.

[21] Appl. No.: 377,804

[22] Filed: May 13, 1982

Related U.S. Application Data

[63] Continuation-in-part of Ser. No. 270,710, Jun. 5, 1981, abandoned.

[51] Int. Cl.³ ............................................. A23G 3/30
[52] U.S. Cl. ........................................... 426/3; 426/6
[58] Field of Search ......................................... 426/3-6

[56] References Cited

U.S. PATENT DOCUMENTS

| | | | |
|---|---|---|---|
| 3,974,293 | 8/1976 | Witzel | 426/4 |
| 3,984,574 | 10/1976 | Comollo | 426/3 |
| 4,187,320 | 2/1980 | Koch et al. | 426/3 |
| 4,241,090 | 12/1980 | Stroz | 426/4 |
| 4,352,822 | 10/1982 | Cherukuri et al. | 426/6 |
| 4,357,355 | 11/1982 | Koch et al. | 426/6 |

FOREIGN PATENT DOCUMENTS 49-88096  4/1974  Japan .

*Primary Examiner*—Jeanette M. Hunter
*Attorney, Agent, or Firm*—R. Kornutik

[57] ABSTRACT

A single phase formulated homogeneous gum base which contains a plasticized elastomer and a plasticized resin without the necessity of ester gum. The base may optionally include softeners, waxes, fillers and/or emulsifier.

48 Claims, No Drawings

GUM BASE AND CHEWING GUM CONTAINING SAME

This application is a continuation-in-part of Ser. No. 06/270,710 filed June 5, 1981, now abandoned.

BACKGROUND OF THE INVENTION

The present invention relates to the art of chewing gum base composition and, in particular, to novel chewing gum base compositions in which desired characteristics can be achieved by unique combinations of primary components heretofor unknown.

Chewing gums, as they are known today, generally comprise a water-soluble flavor portion which is dissipated over a period of time, and a base portion which is insoluble and inert and is retained in the oral cavity throughout mastication. Depending on the intended effect of the particular chewing gum product, the base portion is composited with components selected from the effect achieved thereby and based on their compatibility.

One important component of a gum base is the elastomeric portion which, according to the present state of the art, can include natural elastomers, synthetic elastomers, or combinations thereof. This element of the gum base is important in that it provides the insoluble cud with resiliency to recover from deformation caused by chewing. In preparing gum base, it is important that other components included in the base composition which are included to effect various characteristics in the resulting chewing gum be thoroughly mixed with the elastomeric portion so that the entire cud retain proper resiliency as a homogeneous phase.

In order to achieve a homogeneous phase cud wherein a proper resiliency is constant throughout, it is necessary to provide components which are as nearly miscible with the elastomer as possible. This result is not easily attained in the gum base art because the various components must not only come together as a homogeneous mass during initial mixing but must also remain in the homogeneous state during chewing gum compounding with the water-soluble portion, during processing, e.g., gum unit production and wrapping, and while chewing. Factors such as the effect of the water-soluble components, heat, moisture, etc. must be considered in preparing a useable gum base.

Moreover, since, as in all food arts, chewing gum production is necessarily constrained by economical, processing, marketing, and safety factors, mere physical and chemical compatibility is not the only concern. So constrained, the art of making chewing gum has evolved through the years by building only on known workable combinations of useable ingredients. Consequently, in attempting to achieve a particular attribute or combination of attributes in a chewing gum, it has been necessary to utilize the component known to provide such attribute(s) in the resulting gum along with that component's accompanying compatibilizing ingredients which may detract significantly from the end product or seriously constrain the use of certain other additives such as flavorants, sweetener, antioxidants, etc. with the particular component.

When adding resinous components to elastomers problems enunciated above relative to compatibility are especially troublesome, since both elastomers and resins are polymers. The difference in the nature of an elastomer from that of a resin is, among other things, one of degree of internal mobility between polymer chains.

Both elastomers and polymeric resins inherently have a characteristic intensity of intermolecular interaction, called the cohesive-energy density, which, in general, must be overcome to some extent in order to achieve compatibility between these two types of components. Attractive forces between organic molecules, which account for the characteristic cohesive-energy density, include, among other things, Van der Waals forces, dispersion forces, dipole-dipole forces, dipole-induced dipole forces, and acid-base forces, of which the most important is hydrogen bonding. A gross measure of all such forces can be expressed as a Hildebrand solubility parameter, $\delta$, which is an expression of the solubility of a particular substance.

In theory, the miscibility of polymers relates to those having comparable solubility parameters, which is generally considered in the polymer art as those polymers having a difference in solubility parameters of less than 1.7–2.0, S. Krause, "Polymer Compatibility," *J. Macromal. Sci-Macromal. Chem* C7, pg. 251–314 (1972).

While it is known that straight mechanical shearing may be used to intimately contact polymers having disparate chemical and structural properties, such methods may also depolymerize the components thus destroying desired inherent polymeric properties such as memory (i.e. elasticity) and film forming capabilities (i.e., relative displacement without rupture of intermolecular bonding). To overcome these problems different ingredients have been used in an attempt to compatibilize resins and elastomers without total depolymerization.

In particular, the elastomer styrene-butadiene copolymer (SBR) has in the past required the use of accompanying ester gums (glycerol esters of rosin) in order to effect compatibilization with other chewing gum base components, and in order to achieve film-forming properties which is desired for bubble gum bases. The use of ester gums with styrene-butadiene has, however, been found to generate problems such as inherent oxidative instability and tackiness in the chewing gum product. Furthermore, chewing gum bases made by use of SBR and ester gums characteristically are rigid, very hard, brittle, non-chewable, and require a significant amount of energy as well as the addition of extensive amounts of softeners, fillers, etc. to achieve the proper texture for use in a chewing gum. To overcome the defects associated with the use of styrene-butadiene in combination with ester gums, those skilled in the gum art have traditionally approached the problem on a trial and error basis by incorporating additional ingredients which provide the desired characteristics in the end product.

Now, however, by use of the present invention, which contemplates proper plasticization principles applied to the external plasticization of primary gum base components, i.e., elastomer and resin, heretofor considered incompatible, a soft, inherently stable SBR gum base can be produced which also has excellent film-forming properties and is essentially non-tacky.

Similarly, with regard to polyisobutylene elastomer (PIB) it has been considered necessary to include certain accompanying ingredients to effect compatibilization with other gum base components. For example, U.S. Pat. No. 3,984,574 to Comollo discloses a gum base which includes polyisobutylene in combination with polyvinyl acetate but which also requires additional components such as hydrogenated or partially hydrogenated vegetable oils or animal fats in an amount of 5-50%, and filler (mineral adjuvants) in an amount of 5-40%, in order to allegedly achieve an abhesive or non-tacky base. Indeed, the use of filler with polyisobutylene/polyvinyl acetate in gum base is considered common practice in the art.

Through the present invention, however, polyisobutylene can be combined with the characteristically good film-forming high molecular weight polyvinyl acetate to form a gum base of soft consistency in the absence of not only filler, but also other softening additives usually included in polyisobutylene such as hydrogenated or partially hydrogenated animal fats or vegetable oils.

Furthermore, with respect to the use of isobutylene-isoprene copolymer (butyl rubber), by use of the present invention, a soft gum base with good film-forming characteristics has been achieved in the absence of both ester gums and filler thus making it useable as a bubble gum base.

Therefore, by means of the present invention, many of the problems associated with compounding a desired gum base can be overcome by a rational, technical approach, which, in effect, reduces the trial-and-error method of making gum to a predictable science.

BRIEF DESCRIPTION OF THE INVENTION

In accordance with the present invention, a gum base is provided which is formed essentially of a properly plasticized elastomer, such as, for example, a styrene-butadiene copolymer plasticized as described hereinafter; a properly plasticized resin, such as, for example, polyvinyl acetate, as described hereinafter; and, optionally, a third emulsifying/softening/texturizing component which may include all other abhesive and adhesive types of components generally used in gum base, for example, fillers, such as calcium carbonate or talc, and/or waxes (natural or synthetic) (hydrocarbon or ester type), fatty acids and fatty acid esters, antioxidants, oils, resins (ester gums, polyterpene) and the like. Optionally, fillers such as calcium carbonate and talc, and/or wax can be included in any one or all three components to achieve a desired result.

Based on proper plasticization principles a model gum base formulation scheme has been devised whereby an elastomer such as SBR, polyisobutylene, and isobutylene-isoprene copolymer and a resin such as polyvinyl acetate can be blended in the appropriate proportions to attain the proper texture, resiliency, flavor retention properties, etc. without regard for the necessity of including extraneous ingredients required to make them compatible and/or workable.

Based on previously-espoused theories it has not been considered feasible to render a SBR chewing gum base with film-forming properties in the absence of ester gums, or a PIB/PVAC gum base in the absence of filler and other additives, or a butyl rubber base useable in a bubble gum composition. By means of the present invention, however, excellent film-forming resins such as high molecular weight polyvinyl acetate, i.e., in excess of at least about 20,000 M.W.U., can be made miscible with SBR, PIB, and butyl rubber. In view of the application of solubility theories to the compatibilizing of these primary polymer components this is quite unexpected. Specifically, the primary resin, high molecular weight polyvinyl acetate, has a solubility parameter of approximately 10.6 (Collins, Bares, and Billmeyer, Jr., "Preliminary Evaluation of Polymer Properties," *Experiments in Polymer Science*, page 108 (1973)), whereas the solubility parameter of styrene-butadiene copolymer is approximately 8.3, and polyisobutylene is approximately 7.8 (Bandrup and Immergut, "Solubility Parameter Values," *Polymer Handbook*, pg IV-362-IV-365 (3d ed. 1967), which theoretically renders them somewhat incompatible and, at least, immiscible.

The elastomer component of the gum base of the invention can contain primarily styrene-butadiene copolymer, polyisobutylene, isobutylene-isoprene copolymer, natural rubber (polyisoprene) as well as other masticatory substances of natural origin, such as rubber latex solids, chicle, crown gum, nispero, rosidinha, jelutong, pendare, perillo, niger gutta, tunu, etc. The elastomer is employed in an amount within the range of from about 0.5 to about 30%, and preferably from about 5% to about 20% by weight of the gum base.

To achieve proper plasticization of the elastomer component in order to gain compatibility, several chemical compounds have been discovered to provide surprisingly good plasticization and/or compatibilization of the elastomer with other components, especially resin components.

DETAILED DESCRIPTION OF THE INVENTION

In the preferred embodiments of the present invention, it has been found that plasticization can be achieved with unique gum base component plasticizers, such as oleic acid and butyl stearate, although any of the following gum plasticizers may be employed: mono-, di-, or triglyceryl esters of saturated or unsaturated fatty acids, such as stearic acid, palmitic acid, oleic acid, caprylic acid, capric acid, caproic acid, lauric acid and the like, squalene, mineral oil and liquid petroleum hydrocarbons, squalane, castor oil and other ricinoleate derivatives, diethylene or propylene glycols and derivatives, tributyl acetyl citrate, tributyl citrate, lecithin, coconut oil, glyceryl tributyrate, Zn laurate, Ca stearate, propylene glycol monostearate, propylene glycol monolaurate, fatty acids, butyl sebacate, butyl benzyl sebacate, diacetyl tartaric acid esters of mono- and diglycerides of edible fat oils or edible fat forming acids, petrolatum, stearyl monoglycerides citrate, limonene, polylimonene, polyethylene, butyl lactate and butyl oleate.

Preferably, the styrene-butadiene copolymer is plasticized by use of butyl stearate, glyceryl trioleate, oleic acid, butyl oleate, and butyl benzyl sebacate.

In the case of polyisobutylene, polyisoprene, and isobutylene-isoprene copolymer the preferred plasticizers include polylimonene, petrolatum, mineral oil, squalane, squalene, and liquid hydrocarbons.

The primary resin component used in the present invention is high molecular weight polyvinyl acetate, i.e., at least about 20,000 M.W.U. Other resins which may be employed herein, depending upon the properties desired in final gum base, may include polyvinyl butyl ester, copolymers of vinyl esters and vinyl ethers, polyethylene, ethylene-vinyl acetate copolymers, vinyl acetate-vinyl alcohol copolymers, vinyl acetate-vinyl laurate copolymers. The resin component of the gum base can be present in an amount of from about 5 to about 75% of the gum base and preferably constitutes from about 10 to about 45% by weight of the gum base.

As set forth above high molecular weight polyvinyl acetate is the preferred resin, especially where the gum base is to be used in a bubble gum. In this case, the resin can be properly plasticized using unique plasticizers, such as glyceryl triacetate, acetylated monoglyceride, benzyl benzoate, benzyl butyrate, benzyl phenyl acetate, butyl-2-decenoate, citronellyl butyrate, cresyl acetate, ethyl acetate, diethyl malonate, diethyl sebacate, triethyl citrate, diethyl succinate, glyceryl tributyrate, ethyl laurate, ethyl acetoacetate, diethyl tartrate, ethyl or butyl lactate, acetyl triethyl citrate, diethyl malate, ethyl oleate, sucrose octaacetate, diacetyl tartaric acid ester of mono and diglycerides, stearyl monoglyceridyl citrate, castor oil, succinylated monoglycerides, lactylic and glyceryl lacto esters of fatty acids, or combinations thereof, with the glyceryl triacetate and acetylated monoglyceride combination being preferred.

With respect to the resin component the plasticizer is included in an amount based on weight of the gum base of from about 1% to about 25% and preferably from about 2% to about 15%.

In essence, it has been found that by use of the present invention gum bases may be formed from the elastomer component in combination with high molecular weight polyvinyl acetate. This eliminates the need for ester gums with SBR and, therefore, the accompanying anti-oxidants usually included with ester gums. In the case of PIB, the need for filler and hydrogenated oils or fats has been eliminated and/or reduced significantly; and, with respect to isobutylene-isoprene copolymer, a good film-forming base can be provided in the absence of filler and ester gums, thus making it useable as a bubble gum base. Furthermore, and quite surprisingly, such combinations can be effected without the inclusion of ingredients such as filler, waxes, etc. However, it will be appreciated that a certain amount of ingredients such as ester gums, fillers, waxes, emulsifiers, colorants, etc. may wish to be included to achieve desired properties without detracting from the overall effect of the present invention.

The fillers which can be used in the present gum base in an amount ranging from about 0 to about 60%, and preferably ranging from about 5 to about 45% by weight of the gum base. Examples of fillers suitable for use include, but are not limited to, calcium carbonate, aluminum hydroxide, alumina, magnesium carbonate, dicalcium phosphate, talc (3MgO.4SiO$_2$.H$_2$O), magnesium trisilicate, magnesium hydroxide, aluminum silicates, silica gel, organic fillers and combinations thereof. Calcium carbonate is preferred. However, where acid flavors and/or acid sweeteners, such as the free acid form of saccharin, acid cyclamate or aspartame, are employed in the final chewing gum it is preferred to employ a non-chalk filler, preferably talc.

The gum base of the invention can also include waxes which serve as lubricants and should have a melting point of above about 35° C. and preferably above about 50° C. Examples of such waxes include candelilla wax, carnauba wax, ozokerite, oricury, microcrystalline wax, refined paraffin wax and the like. The waxes will be employed in an amount within the range of from about 1 to about 18% by weight of the gum base, and preferably from about 3 to about 12%. The preferred waxes are microcrystalline wax, and paraffin wax employed in combination so that from about 0 to about 18% (based on the weight of the gum base) of the microcrystalline wax is employed with from about 0 to about 18% (based on the weight of the gum base) of the paraffin wax. The waxes are found to reduce the tackiness of the final gum composition without significantly reducing cohesivity thereof.

The base of the invention can also include a softening agent and lubricant combination which may comprise one or more hydrogenated vegetable or animal fats having a melting point that is above about 22° C., and preferably above about 40° C.; such softening agent and/or lubricant may be employed in amounts ranging from about 0 to about 10% by weight of the gum base, and preferably from about 0.5 to about 7%. Examples of softeners suitable for use herein include, but are not limited to, glyceryl monostearate, lecithin, coconut oil, fatty acids, such as stearic, oleic and palmitic, partially hydrolyzed polyvinyl esters, waxes, such as carnauba wax, candelilla wax and beeswax and cellulose derivatives and mono-, di- and triglyceryl esters of fatty acids as described hereinbefore.

An emulsifier can also be included to impart hydrophilic/hydrophobic balance to the gum base so that saliva will be absorbed thereby making the gum base slippery; the emulsifier will be employed in amounts ranging from about 0 to about 10% by weight of the gum base, and preferably from about 3 to about 9%. Examples of such emulsifiers include glyceryl monostearate, phosphatides, such as lecithin and cephalin, Tweens, Spans and mixtures thereof.

In addition, the gum base can include colorants/pigments, such as titanium dioxide, and anti-oxidants (when necessary to stabilize non-inventive ingredients) in an amount up to 1000 ppm of the gum base, such as butylated hydroxyanisole, butylated hydroxy toluene, and propyl gallate.

The following are general gum base formulations in accordance with the present invention.

| | % by Weight of Gum Base |
|---|---|
| Formulation I | |
| *Elastomer Component* | |
| Elastomer - Styrene-butadiene copolymer | 0.5 to 30% |
| Plasticizer - Butyl Stearate, glyceryl trioleate, oleic acid or other unique plasticizers as defined herein | 0.5 to 40% |
| *Resin Component* | |
| Resin - Polyvinyl acetate (M.W. Greater than 20,000) | 5 to 75% |
| Plasticizer - triacetin and acetylated monoglyceride, or other unique plasticizers as defined herein | 1 to 25% |
| *Optional Third Component(s)* | |
| Filler (CaCO$_3$ or Talc) | 0 to 60% |
| Waxes | 0 to 18% |
| Texturizing/Emulsifying Agents | 0 to 10% |
| Formulation II | |
| *Elastomer Component* | |
| Elastomer - Polyisobutylene, Polyisoprene, and Isobutylene - Isoprene Copolymer | 0.5 to 30% |
| Plasticizer - Polylimonene, petrolatum, squalene, squalane, and other unique plasticizers as defined herein. | 0.5 to 40% |
| *Resin Component* | |
| Resin - Polyvinyl acetate (M.W. Greater than 20,000) | 5 to 75% |
| Plasticizer - triacetin and acetylated monoglyceride, or other unique plasticizers as defined herein. | 1 to 25% |
| *Optional Third Component(s)* | |
| Filler (CaCO$_3$ or Talc) | 0 to 60% |
| Waxes | 0 to 18% |

| | % by Weight of Gum Base |
|---|---|
| Texturizing/Emulsifying agents | 0 to 10% |

It will be appreciated that in the above formulation where a unique type plasticizer is employed with the resin and/or elastomer, an ester gum or other tackifying plasticizer and/or additive may optionally be employed in conjunction with the unique plasticizers. However, the amounts of ester gums or other tackifying plasticizers and/or additives employed in such cases will be relatively small so that the gum base produced may still be provided with substantially reduced tackiness. Examples of ester gums which may optionally be present herein comprise hydrogenated ester gum, that is, glycerol ester of hydrogenated rosin and/or dimerized ester gum, pentaerythritol ester gum, polymerized ester gum, and ester gum. The ester gums may be employed in an amount ranging from about 0 to about 10%, preferably from about 2 to about 7% by weight of the gum base.

In any event, the gum bases of the invention may be formed by preforming each of the primary components and thereafter combining them to form the gum base.

The gum base of the invention may be employed in forming a chewing gum and in such case the gum base will be present in an amount within the range of from about 10 to about 40% and preferably from about 15 to about 30% by weight of the chewing gum.

The chewing gum of the invention may be of the sugar-containing or sugarless variety. Examples of sweeteners which may be employed include sugars, for example, monosaccharides, of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as sugar alcohols, such as sorbitol, mannitol, xylitol, mixtures thereof, as well as hydrogenated starch hydrolysates or isomaltitol, and mixtures of two or more of the above sugars and/or sugar alcohols.

Any of the above sugars may be present in an amount of within the range of from about 0.05 to about 90% and preferably from about 40 to about 85% by weight of the chewing gum. The sugar alcohols, where present, will be employed in an amount of from about 0.05 to about 90% and preferably from about 40 to about 85% by weight of the chewing gum.

The chewing gum of the invention may also contain in lieu of or in addition to any of the above sugars or sugar alcohols an artificial sweetener, such as, for example, aspartame, cyclamate, or a saccharin or other sweetener as set out hereinafter, the artificial sweetener being present in an amount of from about 0 to about 1.5% by weight, and preferably, from about 0.05 to about 0.3% by weight of the chewing gum.

Examples of artificial and natural sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L-phenylalanine methyl ester (aspartame), the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), as well as *Thaumatoccous daniellii* (Thaumatin I and II), *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum of the invention may include flavoring, such as sour or fruit flavoring or non-acid or mint flavoring in an amount ranging from about 0.5 to about 2% by weight of the final chewing gum product. The flavoring may comprise synthetic flavors and oils derived from plants, leaves, flowers, fruit, etc. Representative fruit flavor adjuncts include acids, such as adipic, citric, succinic and fumaric acid, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

By utilizing the proper plasticizer for each of the primary components, the properties of the ultimate gum product can be carefully selected based on the inherent attributes of the component, using other additives to merely enhance, maximize or fine tune the qualities attained by the combination of primary components.

For a better understanding of the present invention, together with other and further objects, reference is made to the following descriptions of specific examples and its scope will be pointed out in the appended claims.

EXAMPLES OF THE INVENTION

STYRENE-BUTADIENE ELASTOMER

The first three examples herein demonstrate the ability to produce a soft, workable gum base with styrene-butadiene copolymer as the elastomer and high molecular weight polyvinyl acetate resin without the use of ester gums and in the absence of additional components which in the past have been considered necessary to provide a useable gum base.

EXAMPLE 1

A gum base was prepared in accordance with the formula shown below which, it is noted, includes neither filler nor ester gum, thereby eliminating the need for antioxidant(s).

| Gum Base Ingredients | Parts by Weight of the Gum Base |
|---|---|
| Elastomer Component | |
| Styrene-butadiene elastomer (24% Bound styrene) | 15 |
| Butyl Stearate | 3 |
| Resin Component | |
| Polyvinyl Acetate (20,000–40,000 M.W.U.) | 65 |
| Glyceryl Triacetate | 9 |
| Acetylated Monoglyceride | 10 |

The ingredients were mixed in a Brabender plasticorder at a temperature of about 80° C. by adding a first portion of the polyvinyl acetate to the SBR, followed by the butyl stearate, the remaining PVAc, the glyceryl triacetate, and acetylated monoglyceride.

The gum base was found to be smooth, and semifluid, flowed easily at the mixing temperature, and retained a fairly constant viscosity as ingredients were added, all of which enhance the economic value of the base since the energy required for blending is thereby minimized.

On cooling, no phase separation was observed and the base possessed film-forming attributes, i.e., it had good bubble-forming properties and could be used as a base for bubble gum. The gum base was also non-stick (abhesive), chewed well, had a bland taste, and good organoleptic quality, i.e., good mouth feel. Since there was no filler included therein, the gum base can be used with acid sweeteners and/or flavors.

Moreover, and perhaps most importantly, the cooled base was soft and easily deformable in contrast to the impenetrable, hard, brittle nature of SBR gum bases known to date. This soft texture markedly increases the economic value of the base because of the reduced work energy required to mechanically masticate the soft base when preparing a chewing gum composition.

EXAMPLE 2

This example shows a styrene-butadiene gum base with the same amount of elastomer as the first example but with a different composition of elastomer and plasticizer therefor.

| Gum Base Ingredients | Parts by Weight of the Gum Base |
|---|---|
| Elastomer Component | |
| Styrene-butadiene elastomer (24% Bound styrene) | 10 |
| Styrene-butadiene elastomer (48% Bound styrene) | 5 |
| Butyl Stearate | 3 |
| Glyceryl trioleate | 3 |
| Resin Component | |
| Polyvinyl Acetate (M.W. 20,000–40,000) | 65 |
| Glyceryl Triacetate | 7 |
| Acetylated Monoglyceride | 7 |

The ingredients were mixed in a Brabender plasticorder as in Example 1 with the same favorable mixing characteristics.

Again there was no observable phase separation upon cooling and the base had good film-forming properties as well as displaying a bland taste, good organoleptic quality, abhesivity, and a generally soft, deformable or malleable texture.

EXAMPLE 3

Another example was prepared in accordance with the formula shown below wherein the amount of elastomer was increased and in which low molecular weight polyvinyl acetate was included.

| Gum Base Ingredients | Parts by Weight of the Gum Base |
|---|---|
| Elastomer Component | |
| Styrene-butadiene elastomer | 20 |
| Butyl Stearate | 5 |
| Resin Component | |
| Polyvinyl Acetate (M.W. 20,000–40,000) | 40 |
| Low Molecular Weight Polyvinyl Acetate | 25 |
| Glyceryl Triacetate | 7 |
| Acetylated Monoglyceride | 3 |

The resulting gum base, which was mixed as in the Examples 1 and 2, enjoyed the same advantageous soft, malleable texture while having good film-forming and abhesive properties.

These formulae provide excellent economical bases for bubble gum because of their good film-forming ability and abhesivity.

In order to demonstrate the unexpected results relative to producing a soft styrene-butadiene base in the absence of ester gum by use of the present invention, tests were conducted on samples of gum base produced in Examples 1, 2 and 3. Since production of a chewing gum composition includes the process of mechanical mastication of the gum base along with the other gum composition ingredients, the ease with which the gum base can be deformed under mechanical pressure is a good measure of its processability. Accordingly, one type of test that can be made to determine the processability of a gum base is a hardness test which is the measure of the resistance of a material to local deformation. Hardness tests generally measure the depth of penetration of an indentor or probe under a specific set of conditions.

Samples from the gum bases prepared in the above Examples were subjected to hardness tests according to ASTM D-1321 employing a penetrometer (Precision Scientific Co.), as were also samples of styrene-butadiene elastomer gum base ester gum included therein as a film-forming ingredient. These tests were conducted at room temperature (24.5° C.) under a constant load of 100 gms.

SBR ester base, which is commonly used as the gum base for bubble gum compositions and is used commercially has the following general formula:

| SBR/Ester Gum Base | Parts by Weight of the Gum Base |
|---|---|
| Styrene-Butadiene Copolymer | 6 to 14% |
| Ester Gum | 18 to 36% |
| Filler (Usually CaCO$_3$) | 18 to 44% |
| Low Molecular Weight PVAc (Organic Filler) | 15 to 45% |
| Waxes | 1 to 26% |
| Fatty Acid Esters | 6 to 15% |

Samples A, B and C were of the SBR/ester gum general formula indicated above, with the exception of Sample C, which contained no fillers.

Each of the samples were subjected to 3 to 5 runs each under the penetrometer and the mean value of penetration in 1/10 millimeters after 5 seconds under constant load was determined in order to minimize the effect of any anomolous results.

Results of the comparative tests are set forth below in Table I.

TABLE I

Penetrometer Test

| Samples | Mean Penetration measured after 5 seconds under constant load of 100 gms. at 24.5° C. |
| --- | --- |
| From Example 1 | 38.5 |
| From Example 2 | 26.8 |
| From Example 3 | 25.6 |
| SBR/Ester A | 4.0 |
| SBR/Ester B | 1.3 |
| SBR/Ester C (No filler) | 5.0 |

As evident from the data the Samples 1, 2 and 3 exhibited a surprisingly lower degree of hardness thus evidencing a highly malleable gum base prepared according to the invention.

While samples of the invention registered a degree of softness clearly an order of magnitude greater than the samples taken from the art, it is believed that gum base measuring no less than about 15 "one-tenth millimeter units" in the above test would offer a significant advantage over the prior art gum bases. Preferably, the gum base would measure no less than about 20, and most preferably no less than about 25.

EXAMPLES 4–6

Chewing gum compositions were prepared utilizing the bases of Examples 1, 2 and 3 according to the following formula.

| Ingredient | Parts by Weight of the Chewing Gum |
| --- | --- |
| Novel Gum Base (as described in Examples 1, 2 and 3) | 24 |
| Sugar Pulverized | 60 |
| Corn Syrup 43° Be | 15 |
| Flavor | 1 |

These chewing gums were found to have a soft texture, good bubble-forming quality, and good organoleptic qualities, as well as having good shelf-life.

The following Examples represent other preferred embodiments of the present invention which include additional ingredients generally used in gum bases.

EXAMPLE 7

A non-tacky gum base of the following formulation was prepared as described below.

| Gum Base Ingredients | Parts by Weight of the Gum Base |
| --- | --- |
| Elastomer Component | |
| Styrene/butadiene elastomer (24% Bound styrene) | 10 |
| Butyl stearate | 10 |
| $CaCO_3$ | 17 |
| Resin Component | |
| Polyvinyl acetate (M.W. 20,000–40,000) | 27 |
| Glyceryl triacetate | 4 |
| Acetylated monoglyceride | 5 |
| $CaCO_3$ | 8 |
| Third Texturizing Component | |
| Triglyceride | 6 |
| Microcrystalline wax (melting point 160° F.) | 4 |
| $CaCO_3$ | 9 |

The styrene-butadiene elastomer and butyl stearate were mixed in a kettle mixer at a temperature of about 120° C. to form the properly plasticized elastomer component, which was added to a Brabender plasti-corder having sigma blades and maintained at 120° C. Thereafter triglyceride was added with mixing, followed by $CaCO_3$, polyvinyl acetate, acetylated monoglyceride, and glyceryl triacetate. A second part of $CaCO_3$ was then added with mixing, followed by microcrystalline wax, and a third portion of $CaCO_3$.

The gum base thereby formed was found to be smooth, semi-fluid and flowed easily at mixing temperature. The base viscosity remained fairly constant as the ingredients were added. On cooling, no phase separation of ingredients was observed.

The above gum base of the invention was non-stick, chewed well, had a good mouth feel, a bland taste and good bubble-blowing properties.

EXAMPLE 8

A non-tacky chalk-free gum base of the following composition was prepared as described below.

| Gum Base Ingredients | Parts by Weight of the Gum Base |
| --- | --- |
| Elastomer Component | |
| Styrene-butadiene (24% Bound styrene) | 11 |
| Butyl stearate | 11 |
| Talc | 15 |
| Resin Component | |
| Polyvinyl acetate (M.W. 20,000–40,000) | 30 |
| Glyceryl triacetate | 5 |
| Acetylated monoglyceride | 6 |
| Talc | 5 |
| Third Texturizing Component | |
| Triglyceride | 7 |
| Microcrystalline wax | 5 |
| Talc | 5 |

The styrene-butadiene elastomer and butyl stearate were mixed in a kettle mixer at a temperature of about 100° C. to form the plasticized elastomer component, which was then added to a Brabender plasti-corder having roller blades and maintained at 110° C. Thereafter the triglyceride was added with mixing, followed by talc, polyvinyl acetate, acetylated monoglyceride, and glyceryl triacetate. A second part of talc was then added with mixing, followed by microcrystalline wax and a third portion of talc.

The gum base thereby formed was found to be smooth and fluid at mixing temperature. The base viscosity remained fairly constant as the ingredients were added. On cooling, no phase separation of ingredients were observed. The above gum base of the invention was non-stick, chewed well, had a good mouth feel, a bland taste, and good bubble-forming properties.

In addition, since this base is free of $CaCO_3$, it can be used with acid flavors and/or acid sweeteners, such as aspartame and free acid form of saccharin.

EXAMPLE 9

A non-tacky chalk-free gum base of the following composition was prepared as described below.

| Gum Base Ingredients | Parts by Weight of the Gum Base |
| --- | --- |
| Elastomer Component | |
| SBR (24% Bound Styrene) | 2.7 |

-continued

| Gum Base Ingredients | Parts by Weight of the Gum Base |
|---|---|
| SBR (48% Bound Styrene) | 7.7 |
| n-Butyl stearate | 10.4 |
| Talc | 15 |
| Resin Component | |
| Polyvinyl acetate (M.W. 20,000–40,000) | 30 |
| Glyceryl triacetate | 5 |
| Acetylated monoglyceride | 5 |
| Talc | 5 |
| Third Texturizing Component | |
| Triglyceride | 7 |
| Paraffin wax | 4.1 |
| Microcrystalline wax | 4.1 |
| Talc | 4 |

Each of the styrene-butadiene elastomers was separately mixed with butyl stearate in a kettle mixer at a temperature of about 100° C., after which the two styrene-butadiene elastomer-butyl stearate batches were added to a Brabender plasti-corder having roller blades and maintained at 110° C. Thereafter the triglyceride was added with mixing followed by talc, polyvinyl acetate, acetylated monoglyceride, and glyceryl triacetate. A second part of talc was then added with mixing followed by paraffin wax, microcrystalline wax and a third part of talc.

The gum base thereby formed was found to be smooth, semi-fluid and flowed easily at mixing temperature. The base viscosity remained fairly constant as the ingredients were added. On cooling, no phase separation of ingredient was observed.

The above gum base of the invention was non-stick, chewed well, had a good mouth feel and bounce, a bland taste, and good bubble-forming properties.

In addition, since it is free of $CaCO_3$, this gum base can be used with acid flavors and/or acid sweeteners such as aspartame and free acid form of saccharin.

EXAMPLE 10

A non-tacky chalk-containing gum base of the following composition was prepared as described below.

| Gum Base Ingredients | Parts by Weight of the Gum Base |
|---|---|
| Elastomer Component | |
| Styrene-butadiene elastomer (24% Bound Styrene) | 2 |
| Styrene-butadiene elastomer (48% Bound Styrene) | 7.2 |
| Ester gum | 9 |
| $CaCO_3$ | 25 |
| Resin Component | |
| Polyvinyl acetate (M.W. 20,000–40,000) | 22 |
| Polyvinyl acetate (M.W. 7,000–17,000) | 5.3 |
| Glyceryl Triacetate | 5 |
| $CaCO_3$ | 5 |
| Third Texturizing Component | |
| Paraffin wax | 5.3 |
| Microcrystalline wax | 4.8 |
| $CaCO_3$ | 9.4 |

The styrene-butadiene elastomers and ester gum were mixed at about 120° C. to form the properly plasticized elastomer component, which was then added to a Brabender plasti-corder having sigma blades and maintained at 120° C. Thereafter $CaCO_3$ was added with mixing followed by polyvinyl acetate, and glyceryl triacetate. A second part of $CaCO_3$ was then added with mixing followed by paraffin wax, microcrystalline wax and a third portion of $CaCO_3$.

The gum base thereby formed was found to be smooth semi-fluid and flowed easily at mixing temperature. The base viscosity remained fairly constant as the ingredients were added. On cooling, no phase separation of ingredients was observed.

The above gum base of the invention was non-stick, chewed well, had a good mouth feel, bland taste, and good bubble-forming properties. Also, the addition of 9% ester gum did not significantly affect the abhesive properties of the base.

EXAMPLE 11

A non-tacky filler-free gum base of the following composition was prepared as described below.

| Gum Base Ingredients | Parts by Weight of the Gum Base |
|---|---|
| Elastomer Component | |
| Styrene-butadiene elastomer (48% Bound Styrene) | 10 |
| Butyl stearate | 10 |
| Resin Component | |
| Polyvinyl acetate (M.W. 20,000–40,000) | 30 |
| Glyceryl Triacetate | 5 |
| Acetylated monoglyceride | 5 |
| Third Texturizing Component | |
| Triglyceride | 10 |
| Paraffin wax | 18 |
| Candelilla wax | 5 |
| Glyceryl monostearate | 7 |

The styrene-butadiene elastomer and butyl stearate were mixed in a kettle mixer at a temperature of about 120° C. to thereby form the plasticized elastomer component which was added to a Brabender plasti-corder having sigma blades and maintained at 120° C. Thereafter, triglyceride was added with mixing followed by polyvinyl acetate, acetylated monoglyceride, and glyceryl triacetate. Glyceryl monostearate was then added with mixing followed by paraffin wax and candellila wax.

The gum base thereby formed was found to be smooth, semi-fluid and flowed easily at mixing temperature. The base viscosity remained fairly constant as the ingredients were added. On cooling, no phase separation of ingredients was observed.

The above gum base of the invention was non-stick, chewed well, had a good mouth feel, bland taste, and good bubble-blowing properties. In addition, since the above base is free of fillers, it can be used with acid flavors and/or acid sweeteners.

EXAMPLE 12

A non-tacky chalk-free gum base of the following composition was prepared as described below.

| Gum Base Ingredients | Parts by Weight of the Gum Base |
|---|---|
| Elastomer Component | |
| SBR (24% Bound Styrene) | 3 |
| SBR (48% Bound Styrene) | 7 |
| Glyceryl trioleate | 8 |
| Ester gum | 5 |
| Talc | 20 |

-continued

| Gum Base Ingredients | Parts by Weight of the Gum Base |
|---|---|
| Resin Component | |
| Polyvinyl acetate (M.W. 20,000–40,000) | 25 |
| Glyceryl Tributyrate | 3 |
| Acetylated monoglyceride | 5 |
| Talc | 5 |
| Third Texturizing Component | |
| Triglyceride | 5 |
| Microcrystalline wax | 5 |
| Talc | 9 |

Each of the styrene-butadiene elastomers was separately mixed with glyceryl trioleate in a kettle mixer at a temperature of about 100° C.

The two styrene-butadiene elastomer-glyceryl trioleate batches were added to a Brabender plasti-corder having roller blades and maintained at 110° C. The ester gum was then added and mixed. Thereafter the triglyceride was added with mixing followed by talc, polyvinyl acetate, acetylated monoglyceride, and glyceryl tributyrate. A second part of talc was then added with mixing followed by microcrystalline wax, and a third portion of talc.

The gum base thereby formed was found to be smooth, semi-fluid and flowed easily at mixing temperature. The base viscosity remained fairly constant as the ingredients were added. On cooling, no phase separation of ingredients was observed.

The above gum base of the invention was non-stick, chewed well, had a good mouth feel and bounce, a bland taste, and good bubble-forming properties.

In addition, since it is free of $CaCO_3$, this gum base can be used with acid flavors and/or acid sweeteners such as aspartame and free acid form of saccharin. Also, the addition of 5% ester gum did not signifantly affect the abhesive properties of the base.

EXAMPLE 13

A non-tacky chalk-free gum base of the following composition was prepared as described below.

| Gum Base Ingredients | Parts by Weight of the Gum Base |
|---|---|
| Elastomer Component | |
| SBR (24% Bound Styrene) | 3 |
| SBR (48% Bound Styrene) | 7 |
| Oleic acid | 8 |
| Ester gum | 10 |
| Talc | 20 |
| Resin Component | |
| Polyvinyl acetate (M.W. 20,000–40,000) | 25 |
| Acetyl Triethyl citrate | 3 |
| Acetylated monoglyceride | 4 |
| Talc | 5 |
| Third Texturizing Component | |
| Microcrystalline wax | 6 |
| Talc | 9 |

Each of the styrene-butadiene elastomers was separately mixed with oleic acid in a kettle mixer at a temperature of about 100° C.

The two styrene-butadiene elastomer-oleic acid batches were introduced into a Brabender plasti-corder having roller blades and maintained at 110° C. The ester gum was then added and mixed. Thereafter, talc was added with mixing followed by polyvinyl acetate, acetylated monoglyceride, and acetyl triethyl citrate. A second part of talc was then added with mixing followed by microcrystalline wax, and a third portion of talc.

The gum base thereby formed was found to be smooth, semi-fluid and flowed easily at mixing temperature. The base viscosity remained fairly constant as the ingredients were added. On cooling, no phase separation of ingredients was observed.

The above gum base of the invention was non-stick, chewed well, had a good mouth feel and bounce, a bland taste, and good bubble-forming properties.

In addition, since it is free of $CaCO_3$, the gum base can be used with acid flavors and/or acid sweeteners such as aspartame and free acid form of saccharin. Also, the addition of 10% ester gum did not significantly affect the abhesive properties of the base.

POLYISOBUTYLENE ELASTOMER

As in the case of styrene-butadiene copolymer elastomer bases, gum bases which included polyisobutylene as the elastomer component were prepared in accordance with the present invention. Once again, and contrary to common practice in the art of preparing polyisobutylene gum bases having good film-forming properties, it was found that by use of the present invention neither filler nor other ingredients normally associated with compatibilizing the primary components, such as hydrogenated animals fats or vegetable oils, were required to produce a soft, essentially non-tacky base.

EXAMPLE 14

A polyisobutylene gum base was prepared as described below according to the following formula.

| Gum Base Ingredients | Parts by Weight of the Gum Base |
|---|---|
| Elastomer Component | |
| Polyisobutylene elastomer | 15 |
| Polylimonene | 3 |
| Resin Component | |
| Polyvinyl acetate (M.W. 20,000–40,000) | 65 |
| Glycerol Triacetate | 9 |
| Acetylated Monoglyceride | 8 |

The ingredients were mixed in a Brabender plasti-corder at a temperature of about 80° C. by introducing the polyisobutylene elastomer followed by a first portion of the polyvinyl acetate, the polylimonene, a second portion of the polyvinyl acetate, glyceryl triacetate, and the acetylated monoglyceride.

The gum base formed was found to be smooth, semi-fluid, flowed easily at the mixing temperatures, and retained a constant viscosity as the ingredients were added, thus enhancing the economic value of the base since the energy required for blending is minimized by these attributes.

On cooling, no phase separation was observed and the base had excellent film-forming attributes and could be used as a base for bubble gum. The gum base was also non-tacky, chewed well, had a bland taste, and good organoleptic quality, i.e. mouth feel. Since, there was no filler included therein, the gum base can be used with acid sweeteners/flavors.

Just as with the SBR/non-filler base, the cooled base was soft and easily deformable, thus increasing the economic value thereof because of the reduced work energy required to mechanically masticate the soft base when preparing a chewing gum composition.

Again, in order to demonstrate the surprising results of the present invention relative to yielding a soft base in the absence of filler and other components, such as hydrogenated vegetable oil, a sample of the polyisobutylene gum base and a sample of a commercially-available polyisobutylene base were subjected to the hardness test as described herein relative to the styrene-butadiene gum base. A representative formula of the commercial base used herein, which is commercially available, is as follows:

| Polyisobutylene Base | Parts by Weight of the Gum Base |
| --- | --- |
| Polyisobutylene | 8–14% |
| PVAc High Molecular Weight | 30–40% |
| Filler | 20–30% |
| Waxes | 8–15% |
| Fatty Acid Esters | 8–15% |
| Softeners | 0–5% |

Each of the samples were subjected to 3 to 5 runs each under the penetrometer, the mean value of penetration in 1/10 millimeters after 5 seconds at a constand load of 100 gms being determined to minimize the effect of anomalous results.

Results of the comparative tests are set forth below in Table II.

TABLE II

Penetrometer Test

| Sample | Mean Penetration Measured After 5 Seconds Under Constant Load of 100 gms. at 24.5° C. |
| --- | --- |
| From Example 14 | 31 |
| Commercial PIB Base | 4.0 |

It is apparent from the data that the sample from Example 14 prepared according to the invention exhibited a degree of hardness an order of magnitude lower than the commercial PIB base even though the comparison sample included filler component which may be expected to cause discontinuity thus a softening effect in gum base.

As explained hereinbefore, while the difference in softness of the gum base prepared in accordance with the invention is an order of magnitude greater, it is believed that gum base registering at least about 15 in accordance with the above test represents a significant advance in the art of producing gum bases; the preferred softness measuring at least about 20 and most preferably at least about 25.

EXAMPLE 15

A chewing gum composition was prepared utilizing the base of Example 14 according to the following formula.

| Ingredient | Parts by Weight of the Chewing Gum |
| --- | --- |
| Novel PIB Gum Base (as described in Example 14) | 24 |
| Sugar Pulverized | 60 |
| Corn Syrup 43° Be | 15 |
| Flavor | 1 |

This chewing gum was found to have a soft texture, good bubble-forming quality, and good organoleptic qualities, as well as having good shelf-life.

ISOBUTYLENE-ISOPRENE COPOLYMER (Butyl Rubber Elastomer)

Further experimentation included production of gum bases according to the invention which included properly plasticized isobutylene-isoprene copolymer as the elastomer component. While butyl rubber is known to be used extensively as a base in stick gum which does not require a high degree of film-forming attributes, the examples described below show that a butyl rubber base including the excellent film-forming high molecular weight polyvinyl acetate can be produced by applying the principles set forth in the invention relative to proper external plasticization. Moreover, the base produced thereby was soft and essentially non-tacky.

EXAMPLE 16

An isobutylene-isoprene copolymer gum base prepared as described below according to the following formula.

| Gum Base Ingredients | Parts by Weight of the Gum Base |
| --- | --- |
| *Elastomer Component* | |
| Isobutylene-Isoprene Copolymer (Butyl Rubber) | 5 |
| Polylimonene | 8 |
| *Resin Component* | |
| Polyvinyl Acetate (20,000–40,000) | 65 |
| Glyceryl Triacetate | 8 |
| Acetylated Monoglyceride | 4 |

The ingredients were mixed in a Brabender plasticorder at a temperature of about 80° C. by first introducing the isobutylene-isoprene copolymer, followed by a first part of the polyvinyl acetate, then the polylimonene, the remaining PVAc, glyceryl triacetate, and acetylated monoglyceride.

The gum base was found to be smooth and semi-fluid, flowed easily at the mixing temperature, and retained a constant viscosity upon addition of the ingredients, thus enhancing the economic value of the base.

No phase separation was observed on cooling and the base possessed good film-forming attributes and could be used as a bubble gum base, unlike previously-known butyl rubber bases.

The cooled base was soft and easily deformable which, again, markedly increases the economic value of the base because of the reduced work energy required to mechanically masticate the soft base when preparing a chewing gum composition.

EXAMPLE 17

A chewing gum composition was prepared utilizing the butyl rubber base of Example 16 according to the following formula.

| Ingredient | Parts by Weight of the Chewing Gum |
| --- | --- |
| Novel Gum Base (as described in Example 16) | 24 |
| Sugar Pulverized | 60 |
| Corn Syrup 43° Be | 15 |

| Ingredient | Parts by Weight of the Chewing Gum |
|---|---|
| Flavor | 1 |

The chewing gums were found to have a soft texture, good bubble-forming quality and good organoleptic qualities, as well as having good shelf life.

EXAMPLE 18

A non-tacky chalk-free butyl rubber gum base was prepared which included other usual gum base components as described below.

| Gum Base Ingredients | Parts by Weight of the Gum Base |
|---|---|
| Elastomer Component | |
| Butyl rubber (Copolymer of isobutylene and isoprene (99:1)) | 10 |
| Petrolatum | 10 |
| Talc | 19 |
| Resin Component | |
| Polyvinyl acetate (M.W. 20,000–40,000) | 30 |
| Glyceryl triacetate | 3 |
| Acetylated monoglyceride | 6 |
| Talc | 8 |
| Third Texturizing Component | |
| Triglyceride | 10 |
| Talc | 4 |

Into a Brabender plasti-corder having roller blades and maintained at 110° C. was added butyl rubber, petrolatum, after which triglyceride was added with mixing, as well as talc, polyvinyl acetate, acetylated monoglyceride, and glyceryl triacetate. A second portion of talc was then added with mixing.

The gum base thereby formed was found to be smooth and fluid at 110° C. The base viscosity remained fairly constant as the ingredients were added. On cooling, no phase separation of ingredient was observed.

The above gum base of the invention was non-stick, chewed well, had a good mouth feel and a bland taste. Since the above base is free of $CaCO_3$, it can be used with acid flavors and/or acid sweeteners, such as aspartame and the free acid form of saccharin.

Further chewing gum compositions can be prepared from the novel gum bases disclosed herein as set forth below.

EXAMPLE 19

A non-tacky bubble gum having the following composition is prepared as described below.

| Ingredient | Parts by Weight of the Chewing Gum |
|---|---|
| Gum Base (as described in Examples 8 and 18) | 22 |
| Sugar pulverized | 52 |
| Corn syrup 43° Be | 23 |
| Flavor | 1 |
| Emulsifiers | 1.5 |
| Color | 0.05 |

The gum base is melted in a kettle at 150° F. and a small portion (10–15%) of the pulverized sugar and the corn syrup are added with mixing over a 5 minute period. Thereafter, the remaining ingredients are added according to conventional chewing gum making practice to form a non-tacky chewing gum in accordance with the invention which has excellent softness and shelf-life.

EXAMPLE 20

A non-tacky bubble gum having the following composition is prepared as described below.

| Ingredient | Parts by Weight of the Chewing Gum |
|---|---|
| Bubble gum base (as described in Examples 7 and 18) | 24 |
| Sugar pulverized | 61 |
| High fructose corn syrup (42% fructose, 29% $H_2O$) | 14 |
| Flavor | 1 |

The gum base is melted in a kettle at 150° F. and a small portion (10–15%) of the pulverized sugar and the high fructose corn syrup are added with mixing over a 5 minute period. Thereafter, the remaining ingredients are added according to conventional chewing gum practice to form a non-tacky chewing gum in accordance with the invention which has excellent softness and shelf-life, has extended flavor and sweetness and very good bubble blowing properties.

EXAMPLE 21

A non-tacky chewing gum having reduced calorie content, in accordance with the present invention, is prepared as described below from the following ingredients.

| Ingredients | Parts by Weight |
|---|---|
| Bubble gum base (as described in Example 10) | 24 |
| Lecithin | 3.5 |
| $CaCO_3$ | 39 |
| Peppermint oil | 1.5 |
| Sodium saccharin | 0.1 |
| Mannitol | 5.5 |
| Sorbitol solution (70% solids) | 19.5 |
| Sorbitol powder | 7 |

The gum base is melted (temperature 270° F.) and placed in a standard dough mixer kettle equipped with sigma blades and cooled to 180° F. Lecithin and calcium carbonate are added and mixed for one minute; peppermint oil and sorbitol solution are then added and mixed for two minutes, mannitol is added and mixed for one minute; and sorbitol powder and saccharin are added and mixed for one minute. The gum is discharged from the kettle and is rolled, scored and cut into 3 g sticks or cubes.

The resulting chewing gum product containing 26.5% sorbitol and 5.5% mannitol is found to be non-tacky and have a pleasant sweet taste and good bubble blowing properties while having a calorie content of only 2.8 calories per piece as opposed to conventional sorbitol containing sugarless chewing gum containing 63.4% sorbitol which also has a pleasant sweet taste but contains 7.6 calories per piece. Thus, the sorbitol containing sugarless chewing gum of the invention contains only 36.7% of the calorie content of conventional sugarless gum or a 63.3% reduction.

EXAMPLE 22

A non-tacky sugarless chewing gum having reduced calorie content, in accordance with the present invention, is prepared as described below from the following ingredients.

| Ingredients | Parts by Weight |
|---|---|
| Gum base (as described in Example 10) | 24 |
| Lecithin | 3.5 |
| $CaCO_3$ | 38 |
| Peppermint oil | 1.5 |
| Water | 6 |
| Mannitol | 5 |
| Sorbitol | 22 |

The gum base is melted (temperature 270° F.) and placed in a standard dough mixer kettle equipped with sigma blades and cooled to 180° F. Lecithin and calcium carbonate are added and mixed for one minute; peppermint oil and water are then added and mixed for two minutes. The water is added to control air entrapment and resultant cud swelling. The gum is discharged from the kettle and is rolled, scored and cut into 3 g sticks or cubes.

The resulting chewing gum product containing 27% sugar alcohols is found to be non-tacky and have a pleasant sweet taste and good bubble blowing properties while having a calorie content of only about 3 calories per piece as opposed to conventional sugarless containing chewing gum containing 63.4% sorbitol which also has a pleasant sweet taste but contains 7.6 calories per piece. Thus, the sugarless chewing gum of the invention contains only 39% of the calorie content of conventional sugar gum or a 61% reduction.

EXAMPLE 23

A non-tacky bubble gum having the following composition is prepared as described below.

| Ingredient | Parts by Weight of the Chewing Gum |
|---|---|
| Gum Base (as described in Example 11) | 22 |
| Sugar pulverized | 52 |
| Corn syrup 43° Be | 23 |
| Flavor | 1 |
| Emulsifiers | 1.5 |
| Color | 0.05 |

The gum base is melted in a kettle at 150° F. and a small portion (10–15%) of the pulverized sugar and the corn syrup are added with mixing over a 5 minute period. Thereafter, the remaining ingredients are added according to conventional chewing gum making practice to form a non-tacky chewing gum in accordance with the invention which has excellent softness and shelf-life.

EXAMPLE 24

A non-tacky bubble gum having the following composition is prepared as described below.

| Ingredient | Parts by Weight of the Chewing Gum |
|---|---|
| Gum Base (as described in Example 9) | 22 |
| Sugar pulverized | 52 |
| Corn syrup 43° Be | 23 |
| Flavor | 1 |
| Emulsifiers | 1.5 |
| Color | 0.05 |

The gum base is melted in a kettle at 150° F. and a small portion (10–15%) of the pulverized sugar and the corn syrup are added with mixing over a 5 minute period. Thereafter, the remaining ingredients are added according to conventional chewing gum making practice to form a non-tacky chewing gum in accordance with the invention which has excellent softness and shelf-life.

EXAMPLE 25

A non-tacky bubble gum having the following composition is prepared as described below.

| Ingredient | Parts by Weight of the Chewing Gum |
|---|---|
| Gum Base (as described in Example 12) | 22 |
| Sugar pulverized | 52 |
| Corn syrup 43° Be | 23 |
| Flavor | 1 |
| Emulsifiers | 1.5 |
| Color | 0.05 |

The gum base is melted in a kettle at 150° F. and a small portion (10–15%) of the pulverized sugar and the corn syrup are added with mixing over a 5 minute period. Thereafter, the remaining ingredients are added according to conventional chewing gum making practice to form a non-tacky chewing gum in accordance with the invention which has excellent softness and shelf-life.

EXAMPLE 26

A non-tacky bubble gum having the following composition is prepared as described below.

| Ingredient | Parts by Weight of the Chewing Gum |
|---|---|
| Gum Base (as described in Example 13) | 22 |
| Sugar pulverized | 52 |
| Corn syrup 43° Be | 23 |
| Flavor | 1 |
| Emulsifiers | 1.5 |
| Color | 0.05 |

The gum base is melted in a kettle at 150° F. and a small portion (10–15%) of the pulverized sugar and the corn syrup are added with mixing over a 5 minute period. Thereafter, the remaining ingredients are added according to conventional chewing gum making practice to form a non-tacky chewing gum in accordance with the invention which has excellent softness and shelf-life.

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A single phase formulation for a homogeneous gum base composition containing an elastomer and a resin in the absence of ester gums required to compatibilize said elastomer comprising a plasticized styrene-butadiene elastomer and a plasticized resin, said elastomer being plasticized to make it compatible with other gum base components by adding a plasticizer selected from the group consisting of butyl stearate, butyl oleate, glyceryl trioleate, oleic acid, and mixtures thereof in an amount sufficient to permit formation of the single phase homogeneous admixture, said plasticized resin being plasticized to make it compatible with other gum base components and with said styrene-butadiene elastomer by adding a plasticizer in an amount sufficient to permit formation of the single phase homogeneous admixture.

2. A gum base composition as in claim 1 wherein said resin is selected from the group consisting of polyvinyl acetate, polyvinyl butyl ester, copolymers of vinyl esters and vinyl ethers, polyethylene, ethylene-vinyl acetate copolymers, vinyl acetate-vinyl alcohol copolymers, and vinyl acetate-vinyl laurate copolymers.

3. A gum base composition as in claim 2 wherein said resin is polyvinyl acetate which has a molecular weight of at least about 20,000.

4. A gum base as in claim 1 wherein the softness is at least about 15 one-tenth millimeters as measured with a penetrometer according to ASTM D-1321 with 100 grams at about 24.5° C.

5. A gum base as in claim 4 wherein the softness is at least about 20 one-tenth millimeters.

6. A gum base as in claim 5 wherein the softness is at least about 25 one-tenth millimeters.

7. The gum base of claim 1 wherein said resin is properly plasticized with a plasticizer selected from the group consisting of glyceryl triacetate, glyceryl tributyrate, trimethyl citrate, benzyl benzoate, benzyl butyrate, benzyl phenyl acetate, butyl-2-decenoate, citronellyl butyrate, cresyl acetate, ethyl acetate, diethyl malonate, diethyl sebacate, ethylacetoacetate, diethyl tartrate, ethyl lactate, butyl lactate, acetyl triethyl citrate, diethyl succinate, diethyl malate, lactic acid, sucrose octaacetate, diacetyl tartaric acid ester of mono- and diglycerides, stearyl mono-glyceridyl citrate, castor oil, succinylated monoglycerides, or lactylic or glyceryl lacto esters of fatty acids, alone or in combination with acetylated monoglyceride.

8. The gum base of claim 7 wherein said resin is properly plasticized with a plasticizer selected from the group consisting of glyceryl triacetate, glyceryl tributyrate, diethyl sebacate, acetyl triethyl citrate, ethyl acetoacetate, ethylacetate, alone or in combination with acetylated monoglyceride.

9. The gum base of claim 1 which is made in the absence of filler.

10. The gum base of claim 1 which also comprises filler selected from the group consisting of $CaCO_3$, aluminum hydroxide, alumina, magnesium carbonate, dicalcium phosphate, talc ($3MgO.4S:O_2.H_2O$), magnesium trisilicate, magnesium hydroxide, silica gel, aluminum silicates, organic fillers, and combinations thereof.

11. The gum base of claim 10 wherein the filler is $CaCO_3$.

12. The gum base of claim 10 wherein the filler is talc.

13. The gum base of claim 1 wherein said elastomer further comprises other masticatory substances of natural origin including rubber latex solids, chicle, crown gum, nispero, rosidinha, jelutong, pendare, perillo, niger gutta, or tunu.

14. The gum base of claim 1 wherein said elastomer is present in said gum base in an amount of from 0.5 to about 30% by weight.

15. The gum base of claim 14 wherein said elastomer is present in an amount of from about 5% to about 20%.

16. The gum base of claim 1 wherein said plasticizer for said elastomer is present in an amount of from about 0.5% to about 40% by weight of said gum base.

17. The gum base of claim 16 wherein said plasticizer is present in an amount of from about 10% to about 25% by weight.

18. The gum base of claim 1 wherein said resin is present in said gum base in an amount of from about 5% to about 75% by weight.

19. The gum base of claim 18 wherein said resin is present in an amount of from about 10% to about 45% by weight.

20. The gum base of claim 18 wherein said plasticizer is present in an amount of from about 1 to about 25% by weight of said gum base.

21. The gum base of claim 20 wherein said plasticizer is present in an amount of from about 2% to about 15% by weight of said gum base.

22. A chewing gum prepared using the base as in claim 1 which includes sweeteners selected from the group consisting of mono- and disaccharides, intense sweeteners of artificial or natural origin, sugar alcohols, hydrogenated starch hydrolysates and corn syrup.

23. The gum base composition of claim 1 which further comprises a third component comprised of fillers, emulsifying agents, softening agents, texturizing agents and waxes.

24. A method of producing a single phase homogeneous chewing gum base composition in the absence of gum base components other than an elastomer and a resin comprising:

plasticizing an elastomer component selected from the group consisting of styrene-butadiene, polyisobutylene and isoprene-isobutylene copolymer sufficiently so that it is compatible with a resin component as well as other gum base ingredients by adding a plasticizer, in the case of styrene-butadiene, selected from the group consisting of butyl stearate, butyl oleate, glyceryl trioleate, oleic acid, and mixtures thereof, and, in the case of polyisobutylene and isoprene-isobutylene copolymer, selected from the group consisting of polylimonene, petrolatum, liquid petroleum hydrocarbons, squalane, squalene, and mineral oil in an amount sufficient to permit the formation of the single phase homogeneous admixture, plasticizing a resin component selected from the group consisting of polyvinyl acetate, polyvinyl butyl ester, copolymers of vinyl esters and vinyl ethers, polyethylene, ethylene-vinyl acetate copolymers, vinyl acetate-vinyl laurate copolymers sufficiently so that it is compatible with an elastomer component by adding a plasticizer selected from the group consisting of glyceryl triacetate, glyceryl tributyrate, diethyl sebacate, acetyl triethyl citrate, ethylacetoacetate, alone or in combination with acetylated monoglyceride in an amount sufficient to permit the formation of the single phase homogeneous admixture, mixing said plasticized components to form a single homogeneous gum base mass, and optionally, adding a third phase of components to said homogeneous mass to again yield a single phase homogeneous gum base mass, which contains desired product characteristics.

25. A single phase formulation for a homogeneous gum base composition containing an elastomer and a resin in the absence of other gum base components required to compatibilize said elastomer comprising a plasticized non-styrene-butadiene elastomer and a plasticized resin, said elastomer being plasticized to make it compatible with other gum base components by adding a plasticizer selected from the group consisting of polylimonene, petrolatum, liquid petroleum hydrocarbons, squalane, squalene, and mineral oil in an amount sufficient to permit formation of the single phase homogeneous admixture, said plasticized resin being plasticized to make it compatible with other gum base components and with said non-styrene-butadiene elastomer by adding a plasticizer in an amount sufficient to permit formation of the single phase homogeneous admixture.

26. The gum base composition of claim 25 wherein said elastomer is one of polyisobutylene and isobutylene-isoprene copolymer.

27. The gum base composition of claim 25 which further comprises a third component comprised of fillers, emulsifying agents, softening agents, texturizing agents and waxes.

28. The gum base composition of claim 25 wherein said resin is selected from the group consisting of polyvinyl acetate, polyvinyl butyl ester, copolymers of vinyl esters and vinyl ethers, polyethylene, ethylene-vinyl acetate copolymers, vinyl acetate-vinyl alcohol copolymers, and vinyl acetate-vinyl laurate copolymers.

29. The gum base composition of claim 28 wherein said resin is polyvinyl acetate which has a molecular weight of at least about 20,000.

30. A gum base composition as in claim 25 wherein the softness is at least about 15 one-tenth millimeters as measured with a penetrometer according to ASTM D-1321 with 100 grams at about 24.5° C.

31. A gum base composition as in claim 30 wherein the softness is at least about 20 one-tenth millimeters.

32. A gum base composition as in claim 31 wherein the softness is at least about 25 one-tenth millimeters.

33. The gum base composition of claim 25 wherein said resin is properly plasticized with a plasticizer selected from the group consisting of glyceryl triacetate, glyceryl tributyrate, trimethyl citrate, benzyl benzoate, benzyl butyrate, benzyl phenyl acetate, butyl-2-decenoate, cintronellyl butyrate, cresyl acetate, ethyl acetate, diethyl malonate, diethyl sebacate, ethylacetoacetate, diethyl tartrate, ethyl lactate, butyl lactate, acetyl triethyl citrate, diethyl succinate, diethyl malate, lactic acid, sucrose octaacetate, diacetyl tartaric acid ester of mono- and diglycerides, stearyl mono-glyceridyl citrate, castor oil, succinylated monoglycerides, or lactylic or glyceryl lacto esters of fatty acids, alone or in combination with acetylated monoglyceride.

34. The gum base composition of claim 33 wherein said resin is properly plasticized with a plasticizer selected from the group consisting of glyceryl triacetate, glyceryl tributyrate, diethyl sebacate, acetyl triethyl citrate, ethyl acetoacetate, ethylacetate, along or in combination with acetylated monoglyceride.

35. The gum base composition of claim 25 which is made in the absence of filler.

36. The gum base composition of claim 25 which also comprises filler selected from the group consisting of $CaCO_3$, aluminum hydroxide, alumina, magnesium carbonate, dicalcium phosphate, talc ($3MgO.4SiO_2.H_2O$), magnesium trisilicate, magnesium hydroxide, silica gel, aluminum silicates, organic fillers, and combinations thereof.

37. The gum base composition of claim 36 wherein the filler is $CaCO_3$.

38. The gum base composition of claim 36 wherein the filler is talc.

39. The gum base composition of claim 25 wherein said elastomer further comprises other masticatory substances of natural origin including rubber latex solids, chicle, crown gum, nispero, rosidinha, jelutong, pendare, perillo, niger gutta, or tunu.

40. The gum base composition of claim 25 wherein said elastomer is present in said gum base in an amount of from 0.5% to about 30% by weight.

41. The gum base composition of claim 40 wherein said elastomer is present in an amount of from about 5% to about 20%.

42. The gum base composition of claim 25 wherein said plasticizer for said elastomer is present in an amount of from about 0.5% to about 40% by weight of said gum base.

43. The gum base composition of claim 42 wherein said plasticizer is present in an amount of from about 10% to about 25% by weight.

44. The gum base composition of claim 25 wherein said resin is present in said gum base in an amount of from about 5% to about 75% by weight.

45. The gum base composition of claim 44 wherein said resin is present in an amount of from about 10% to about 45% by weight.

46. The gum base composition of claim 44 wherein said plasticizer is present in an amount of from about 1% to about 25% by weight of said gum base.

47. The gum base composition of claim 46 wherein said plasticizer is present in an amount of from about 2% to about 15% by weight of said gum base.

48. A chewing gum prepared using the base as in claim 25 which includes sweeteners selected from the group consisting of mono- and disaccharides, intense sweeteners of artificial or natural origin, sugar alcohols, hydrogenated starch hydrolysates and corn syrup.

* * * * *